(12) United States Patent
Kobuse et al.

(10) Patent No.: US 11,503,218 B2
(45) Date of Patent: Nov. 15, 2022

(54) ELECTRONIC DEVICE FOR EXECUTING PREDETERMINE PROCESSING BASED ON IMAGE DATA ACQUIRED VIA FILTERS HAVING DIFFERENT POLARIZATION ANGLES, CONTROL METHOD OF THE SAME, AND STORAGE MEDIUM

(71) Applicant: CANON KABUSHIKI KAISHA, Tokyo (JP)

(72) Inventors: Takenori Kobuse, Kanagawa (JP); Yoshikazu Ishikawa, Kanagawa (JP); Takayuki Kimura, Kanagawa (JP); Yusuke Yamashita, Kanagawa (JP); Tokuro Nishida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 151 days.

(21) Appl. No.: 17/121,105

(22) Filed: Dec. 14, 2020

(65) Prior Publication Data

US 2021/0195080 A1   Jun. 24, 2021

(30) Foreign Application Priority Data

Dec. 18, 2019   (JP) .............................. JP2019-228208

(51) Int. Cl.
*H04N 5/235*   (2006.01)
*H04N 5/232*   (2006.01)
(Continued)

(52) U.S. Cl.
CPC .......... *H04N 5/2351* (2013.01); *G01N 21/19* (2013.01); *H04N 5/23212* (2013.01); *H04N 9/045* (2013.01); *H04N 2005/2255* (2013.01)

(58) Field of Classification Search
CPC .. H04N 5/2351; H04N 5/23212; H04N 9/045; H04N 2005/2255; H04N 5/2254;
(Continued)

(56) References Cited

U.S. PATENT DOCUMENTS 10,334,180 B1 *   6/2019   Asano ................... G02B 27/281
2021/0152749 A1 *   5/2021   Kurita ................... H04N 5/2256
2021/0266444 A1 *   8/2021   Kitamura ............. H04N 5/2351

FOREIGN PATENT DOCUMENTS

JP          2016085248 A      5/2016

* cited by examiner

*Primary Examiner* — Shahbaz Nazrul
(74) *Attorney, Agent, or Firm* — Canon U.S.A., Inc. IP Division (57) ABSTRACT

An electronic device acquires polarization information of a subject based on a plurality of pieces of image data based on a first signal output from a first sensor. The first sensor can capture an optical image of the subject acquired via a polarizing filter provided with areas having different polarization angles. The device further acquires an evaluation value for controlling brightness of an image at the time of capturing the optical image of the subject, based on the plurality of pieces of image data. The plurality of pieces of image data have different polarization angles, by respectively being acquired via areas of the polarizing filter having the plurality of different polarization angles. A degree of weighting to be assigned to the plurality of pieces of image data at the time of acquiring the evaluation value based on the polarization information.

19 Claims, 6 Drawing Sheets

(51) Int. Cl.
*G01N 21/19* (2006.01)
*H04N 9/04* (2006.01)
*H04N 5/225* (2006.01)

(58) Field of Classification Search
CPC .... H04N 5/2258; H04N 5/2353; H04N 5/238; H04N 5/243; H04N 9/04551; G01N 21/19
See application file for complete search history.

ELECTRONIC DEVICE FOR EXECUTING PREDETERMINE PROCESSING BASED ON IMAGE DATA ACQUIRED VIA FILTERS HAVING DIFFERENT POLARIZATION ANGLES, CONTROL METHOD OF THE SAME, AND STORAGE MEDIUM

BACKGROUND OF THE DISCLOSURE

Field of the Disclosure

The aspect of the embodiments relates to an electronic device, a control method of the electronic device, and a storage medium. The aspect of the embodiments especially relates to a technology of acquiring an evaluation value to be used at the time of executing predetermined processing based on image data acquired via filters having a plurality of different polarization angles.

Description of the Related Art

In an imaging device such as a digital camera, various technologies for acquiring an image having appropriate brightness corresponding to a freely-selected subject have been conventionally known. Specifically, a technology that has been known is to perform exposure control, white balance adjustment, gamma adjustment, and the like at the time of capturing an image of a subject and acquiring image data based on brightness of the subject obtained by photometry. For example, an imaging device that has been known is configured to, in a case where the face of a person exists in an imaging area (imaging screen), determine a face area detected by face detection as a main subject, and automatically adjust a focus, white balance, and exposure so as to appropriately capture an image of the face area. Japanese Patent Laid-Open No. 2016-85248 discusses a technology of generating in a digital camera a photometric value for exposure control by assigning weights to a photometric value of a portion recognized as the face and a photometric value of the whole of a screen.

SUMMARY OF THE DISCLOSURE

According to an aspect of the embodiments, there is provided an electronic device, comprising: at least one processor; and at least one memory coupled to the at least one processor storing instructions that, when executed by the at least processor, cause the at least processor to function as: an information acquisition unit configured to acquire polarization information of a subject based on a plurality of pieces of image data that are based on a first signal output from a first sensor, wherein the first sensor is capable of capturing an optical image of the subject acquired via a polarizing filter provided with areas having different polarization angles; a control unit configured to control brightness of an image at the time of acquiring image data by capturing the optical image of the subject; and an evaluation value acquisition unit configured to acquire an evaluation value to be used by the brightness control unit to control the brightness, based on at least one of the plurality of pieces of image data, wherein the plurality of pieces of image data have different polarization angles, by respectively being acquired via areas of the polarizing filter having the plurality of different polarization angles, and wherein the evaluation value acquisition unit is configured to set a degree of weighting to be assigned to the plurality of pieces of image data at the time of acquiring the evaluation value, based on the polarization information.

According to another aspect of the embodiments, there is provided a control method of an electronic device, comprising: acquiring polarization information of a subject based on a plurality of pieces of image data that are based on a first signal output from a first sensor, wherein the first sensor is capable of capturing an optical image of the subject acquired via a polarizing filter provided with areas having different polarization angles; and acquiring an evaluation value to be used to control brightness of an image at the time of capturing the image of the subject and acquiring image data based on at least one of the plurality of pieces of image data, wherein the plurality of pieces of image data have different polarization angles, by respectively being acquired via areas of the polarizing filter having the plurality of different polarization angles, and wherein the acquisition of the evaluation value includes setting a degree of weighting to be assigned to the plurality of pieces of image data at the time of acquiring the evaluation value based on the polarization information.

According to a further aspect of the embodiments, there is provided a non-transitory computer-readable storage medium storing a computer-executable program for executing a method of controlling an electronic device, the method comprising: acquiring polarization information of a subject based on a plurality of pieces of image data that are based on a first signal output from a first sensor, wherein the first sensor is capable of capturing an optical image of the subject acquired via a polarizing filter provided with areas having different polarization angles; and acquiring an evaluation value to be used to control brightness of an image at the time of capturing the image of the subject and acquiring image data based on at least one of the plurality of pieces of image data, wherein the plurality of pieces of image data have different polarization angles, by respectively being acquired via areas of the polarizing filter having the plurality of different polarization angles, and wherein the acquisition of the evaluation value includes setting a degree of weighting to be assigned to the plurality of pieces of image data at the time of acquiring the evaluation value based on the polarization information.

Further features of the disclosure will become apparent from the following description of exemplary embodiments (with reference to the attached drawings).

DESCRIPTION OF THE EMBODIMENTS

First Exemplary Embodiment (Basic Configuration of Imaging Device 100)

Figure 1:
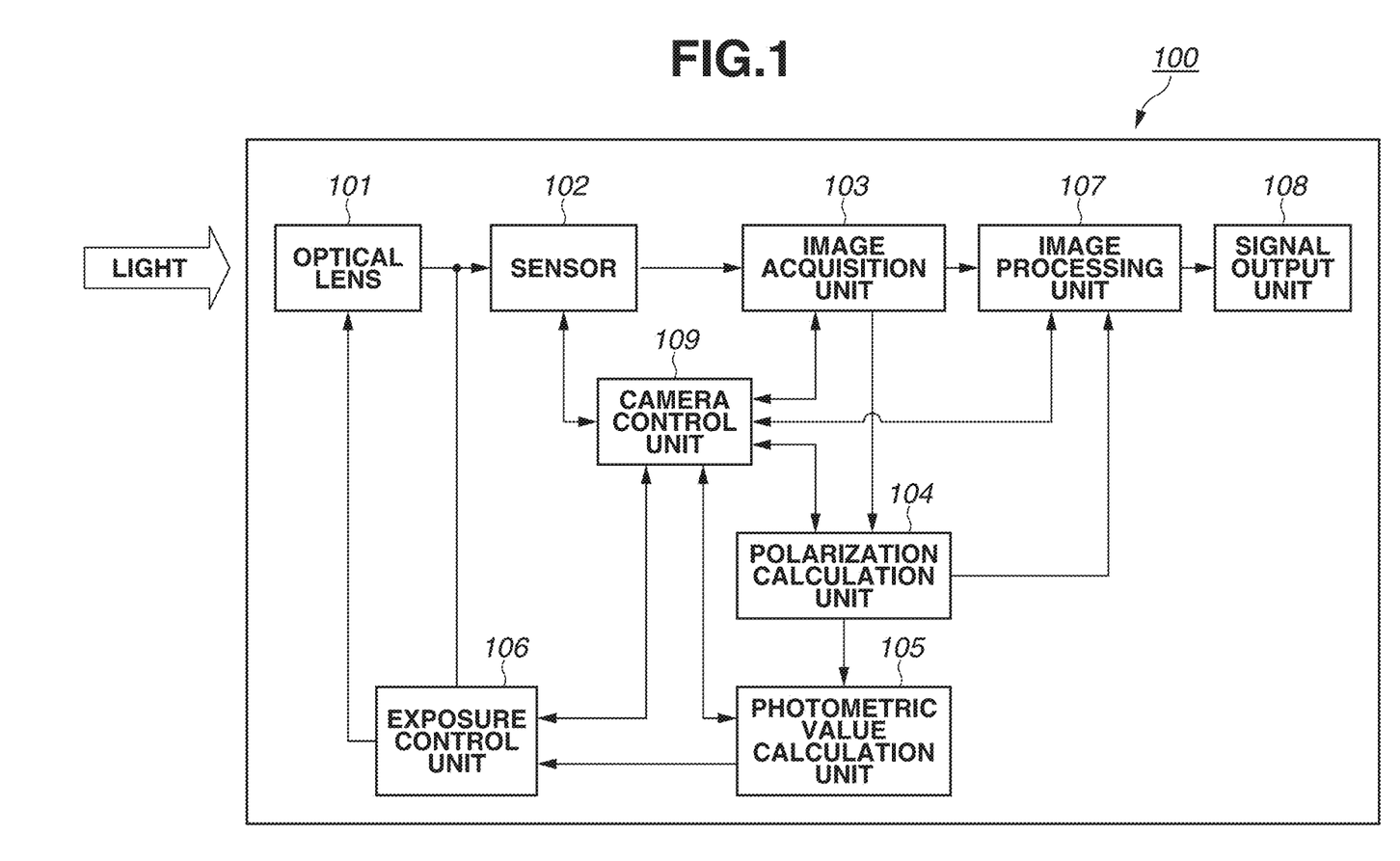
FIG. 1 is a block diagram illustrating a configuration of an imaging device 100 according to a first exemplary embodiment in which the disclosure is implemented.

Exemplary embodiments of the disclosure will be described below with reference to the accompanying drawings. FIG. 1 is a block diagram illustrating a configuration of an imaging device 100 serving as an electronic device according to a first exemplary embodiment in which the disclosure is implemented. One or more functional blocks illustrated in FIG. 1 may be implemented by hardware such as an application-specific integrated circuit (ASIC) and a programmable logic array (PLA). Alternatively, one or more functional blocks may be implemented by a programmable processor (a microprocessor or a microcomputer) such as a central processing unit (CPU) and a microprocessing unit (MPU) executing software. Still alternatively, one or more functional blocks may be implemented by software and hardware in combination. Therefore, in the following description, even in a case where different functional blocks are described as operational subjects, these functional blocks can be implemented by identical hardware as operational subjects.

An optical lens 101 is an imaging optical system to lead a light flux, which represents an optical image of a subject, to the inside of the imaging device 100, and can form an optical image on an imaging plane of a sensor 102, which will be described below.

The sensor 102 is an imaging unit that adopts a solid-state image sensor of a charge storage type, such as a complementary metal-oxide semiconductor (CMOS) sensor, which can receive the light flux of the subject led by the optical lens 101, and convert the light flux to an electric image signal. The imaging device 100 can change sensitivity (light receiving sensitivity) at the time of converting an optical image corresponding to the light flux of the subject to an electric signal. Adjusting the light receiving sensitivity and a digital gain after conversion into an image signal can adjust brightness of the image signal. In the present exemplary embodiment, such sensitivity is collectively referred to as imaging sensitivity. The imaging device 100 can adjust the imaging sensitivity by changing International Standards Organization (ISO) sensitivity.

Figure 2A:
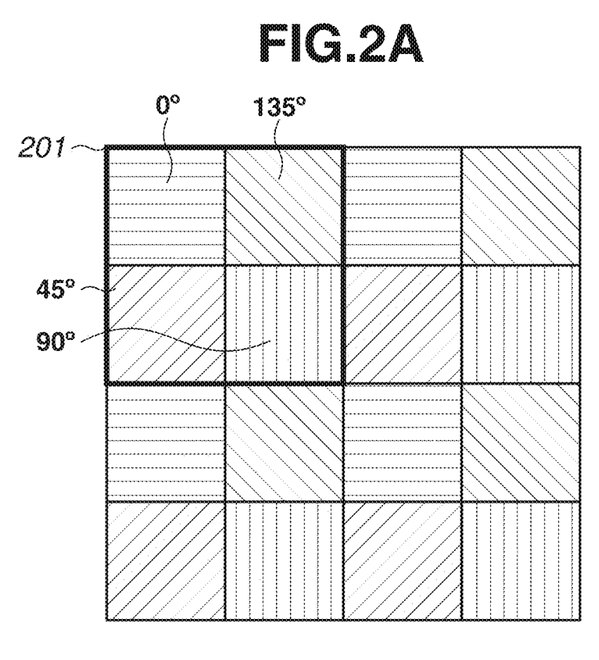
FIGS. 2A and 2B are diagrams each exemplarily illustrating a relationship between pixels and polarizing filters of a sensor 102 according to a first exemplary embodiment of the disclosure.
Figure 2B:
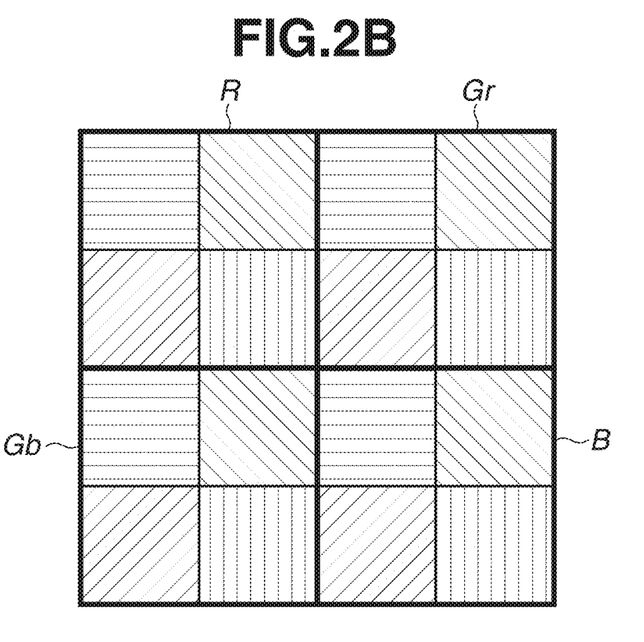

The sensor 102 includes a polarizing filter on each pixel, and includes at least three or more different angles as polarization angles of the polarizing filters. Details of the sensor 102 provided with the polarizing filter will be exemplarily described with reference to FIGS. 2A and 2B. FIGS. 2A and 2B are diagrams each exemplarily illustrating a relationship between the pixels and the polarizing filters of the sensor 102 according to the first exemplary embodiment of the disclosure. FIG. 2A is a diagram illustrating a relationship between each pixel included in a partial area 201 of the sensor 102 and a polarization angle of the polarizing filter. FIG. 2B is a diagram illustrating an array of pixels and color filters in the partial area 201.

As illustrated in FIG. 2A, in the sensor 102, polarizing filters are regularly arranged at polarization angles of 0°, 45°, 90°, and 135° with respect to the respective pixels in the partial area 201, in which, for example, 16 pixels (a consecutive four by four matrix of pixels) constitute one pixel group. The polarization angles are not limited thereto with respect to the filter arrangement, in one embodiment, the polarizing filters are to be regularly arranged in alignment with the arrangement of the color filters, which will be described below, because processing load at the time of acquiring image data at each polarization angle is reduced. Polarization angles other than the four angles described above may be used.

As illustrated in FIG. 2B, an identical color filter is arranged with respect to every four pixels (a consecutive 2 by 2 matrix of pixels) constituting the partial area 201. In the present exemplary embodiment, a color filter R is arranged in alignment with upper left four pixels in the partial area 201 as illustrated in FIG. 2B. Color filters Gb and Gr are arranged in alignment with lower left four pixels and upper right four pixels, respectively, in the partial area 201. A color filter B is arranged in alignment with lower right four pixels in the partial area 201.

Thus, the sensor 102 is provided with the color filters in a so-called Bayer array in alignment with units of four pixels constituting the partial area 201. Thus, with the partial area 201 used as a reference, image signals of capturing images at the four polarization angles with respect to each color filter can be acquired, and an image signal at each polarization angle, which combines color components of R, Gr, Gb, and B, can be acquired. In the present exemplary embodiment, polarization information of the subject can be acquired based on signals acquired from four pixels having different polarization angles, as described below. The polarization information according to the present exemplary embodiment is represented as a difference value of pixel levels output from pixels corresponding to the respective polarization angles.

Back to FIG. 1, an image acquisition unit 103 is an image acquisition unit that acquires an output of the sensor 102 as image data. The image acquisition unit 103 outputs image data at each polarization angle to a polarization calculation unit 104 based on an output of the sensor 102. The image acquisition unit 103 outputs image data for recording to an image processing unit 107.

The polarization calculation unit 104 is a calculation unit (polarization information acquisition unit) that calculates a polarization angle corresponding to a subject included in an imaging range based on the image data output from the image acquisition unit 103, and can acquire polarization information of the subject. Specifically, assume that the four pixels corresponding to the respective polarization angles of 0°, 45°, 90°, and 135° are a set. Based on signals output from the pixels corresponding to the polarizing filters with the respective polarization angles, the polarization calculation unit 104 acquires a difference value by subtracting a minimum value from a maximum value out of signal levels of the pixels corresponding to the respective four polarization angles described above. An area in which an integral value of difference values is greater than a predetermined threshold can be determined to be an area in which reflection of light by the subject occurs. For example, in a case where a photometric frame for photometry preset to the imaging device 100 is a predetermined area, it is possible to detect whether reflection occurs in each photometric frame using the integral value of the difference values described above in this predetermined area.

Figure 3:
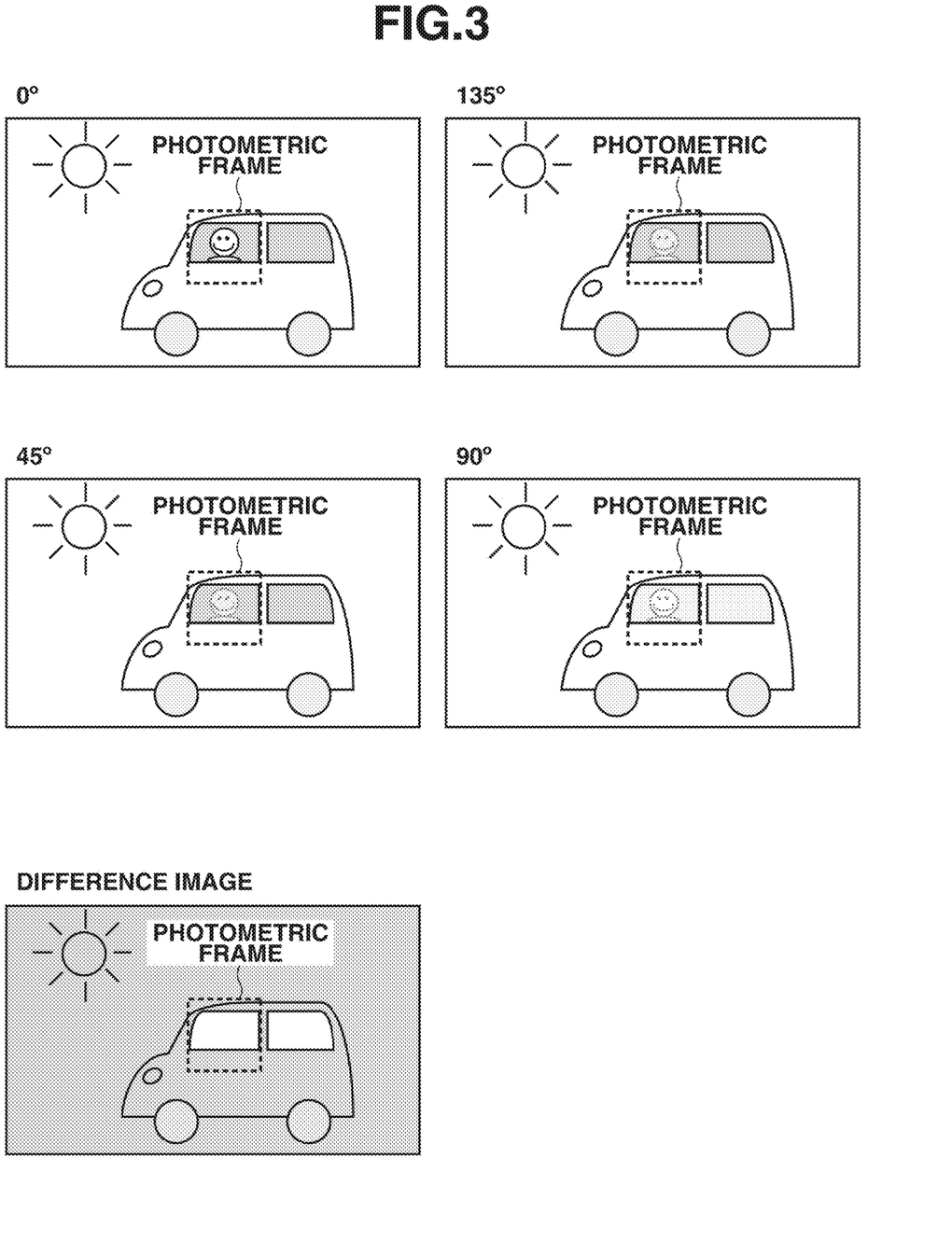
FIG. 3 is a diagram exemplarily illustrating image data of each polarization angle in a condition in which reflection of light can occur on window glass of an automobile according to the exemplary embodiment of the disclosure.

FIG. 3 is a diagram exemplarily illustrating pieces of image data at respective polarization angles in a condition in which reflection of light can occur on window glass of an automobile according to the exemplary embodiments of the disclosure. As illustrated in FIG. 3, image data at a polarization angle of 0° has a low reflectance of light on window glass, and is in a state in which a face area of an occupant of an automobile can be vividly seen. In contrast, image data at a polarization angle of 90° has a high reflectance of light on window glass and is in a state in which the face area of the occupant cannot be seen well. Each of a piece of image data at a polarization angle of 45° and a piece of image data at a polarization angle of 135° is image data having an intermediate reflectance between the reflectance at the polarization angle of 0° and the reflectance at the polarization angle of 90°.

A difference image illustrated in FIG. 3 is an image based on the difference value between the maximum and minimum values out of the signal levels of the images acquired from the pieces of image data of the respective polarization angles, assuming that there is no reflection of light on portions other than the window glass in the condition described above. In this case, the difference image based on a difference between the piece of image data at the polarization angle of 90° which causes a maximum reflectance and the piece of image data at polarization angle of 0° which causes a minimum reflectance can be acquired with respect to a portion of the window glass, and thus it can be understood that a reflectance on the portion of the window glass is high. Assuming that the photometric frame is set at a position illustrated in FIG. 3, the polarization calculation unit 104 determines that reflection of light occurs in the photometric frame.

Back to FIG. 1, a photometric value calculation unit 105 is a photometry unit that calculates a photometric value as an evaluation value for exposure control. While exposure values adjustable in the exposure control according to the present exemplary embodiment are an f-stop number related to an aperture diameter, a shutter speed according to a charge storage time in the sensor 102, and ISO sensitivity, an exposure value other than these values may be adjustable.

For example, in a case where the polarization calculation unit 104 determines that the reflection of light occurs, the photometric value calculation unit 105 calculates the photometric value using the piece of image data having the minimum signal level of pixels included in the photometric frame, out of the plurality of pieces of image data acquired at the respective polarization angles. For example, in a case where the polarization calculation unit 104 determines that the reflection of light does not occur, the photometric value calculation unit 105 calculates the photometric value using image data of all pixels regardless of polarization angles. The image data of all the pixels are to be data acquired by cumulating signal levels of pixels in the pieces of image data of the respective polarization angles. Which of image data at a freely-selected polarization angle and image data of all the pixels is to be used for calculating the photometric value may be selectable depending on a condition (e.g., freely-selected by a user) other than the condition on which the polarization calculation unit 104 makes the determination. While a method of calculating the photometric value may be any known method, examples of the method include a method of dividing image data into a plurality of blocks and calculating an average value (a luminance value) of signal values of each block. The luminance value of each block is integrated to acquire a representative luminance value (a photometric value). For example, the imaging device 100 may be configured to set a degree of weighting assigned to an area included in the photometric frame higher than degrees of weighting assigned to the other areas, or calculate the photometric value based on a luminance value of the area included in the photometric frame. Another method of calculating the photometric value according to photometry can be set as appropriate.

An exposure control unit 106 is an exposure control unit that performs exposure control using the exposure values described above (the f-stop number, the shutter speed, and the ISO sensitivity), and performs control to make brightness of the subject appropriate (in an appropriate exposure state) based on the photometric value obtained by the photometric value calculation unit 105.

The image processing unit 107 is an image processing unit that performs various kinds of processing such as freely-selected combining processing using the pieces of image data corresponding to the respective polarization angles, deBayer processing, and gamma correction. Specifically, as an example of the combining processing, the image processing unit 107 can generate image data of one frame whose reflectance is freely adjusted by selecting the piece of image data at the freely-selected polarization angle based on a result of the determination made by the polarization calculation unit 104 and outputting the image data of one frame, or weighted-averaging the pieces of image data at the respective polarization angles based on a result of the determination made by the polarization calculation unit 104 and outputting the image data of one frame. The image processing unit 107 can perform, after performing the combining processing, predetermined image processing such as the deBayer processing and gamma correction described above, knee correction, and noise reduction. In the present exemplary embodiment, the various kinds of processing performed on image data output to a signal output unit 108 is not limited thereto, and the image processing unit 107 may be configured to perform another process. The image processing unit 107 can also output acquired pixel data as it is to each unit in a subsequent procedure.

The signal output unit 108 is a signal output unit that outputs an image signal input from the image processing unit 107 to a storage unit (including an external storage medium), which is not illustrated, and that outputs image data for display to a display unit, which is not illustrated.

A camera control unit 109 is a control unit that performs centralized control of each unit of the imaging device 100 and each unit of a camera accessory mounted on the imaging device 100, and is provided with a microprocessor (CPU), which is not illustrated. In the present exemplary embodiment, the imaging device 100 is configured such that the camera control unit 109 controls an operation of each unit described above, but may be configured such that units other than the camera control unit 109 control respective operations in a coordinated manner (Detailed Description of Exposure Control)

Figure 4:
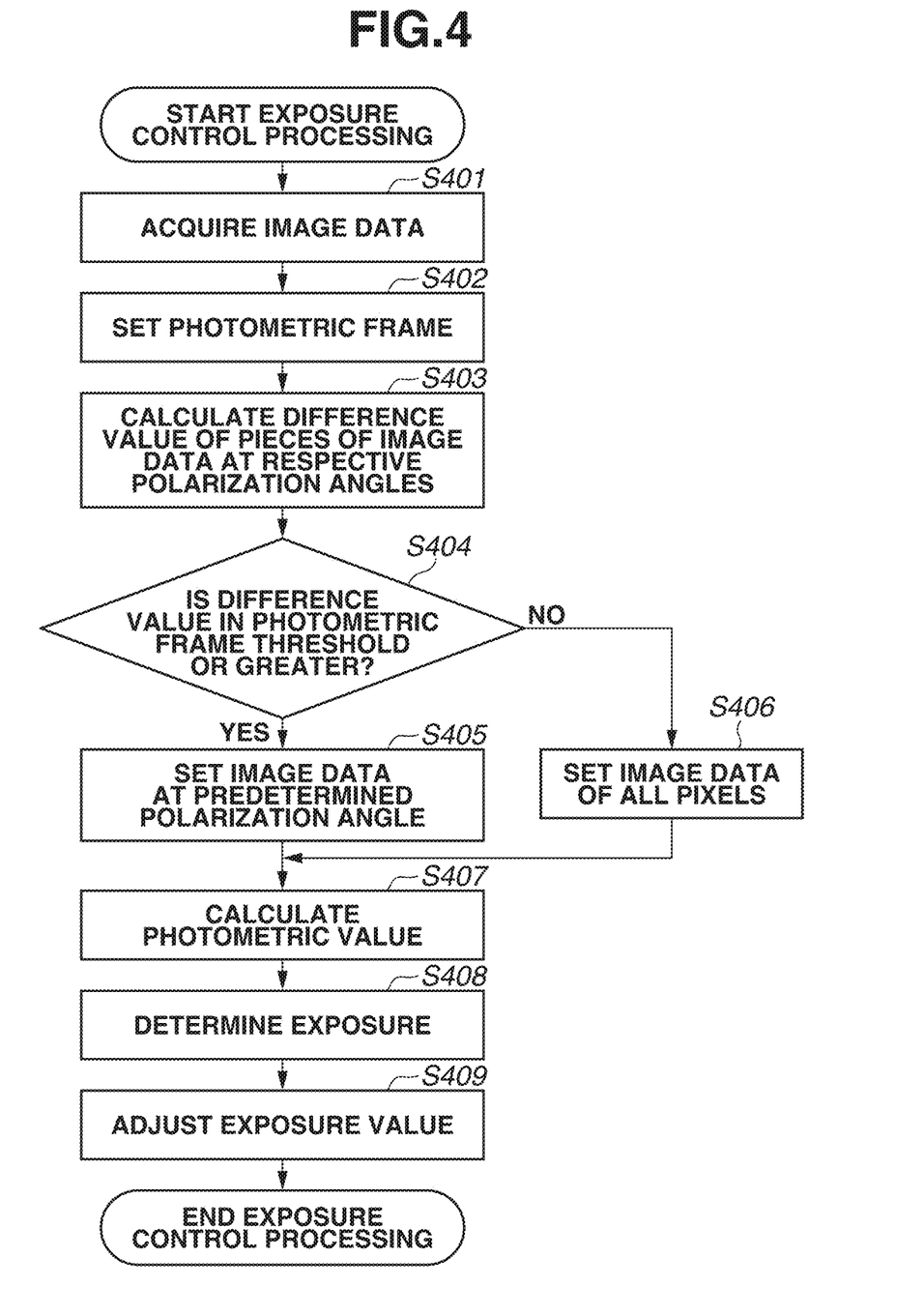
FIG. 4 is a flowchart exemplarily illustrating exposure control processing according to the first exemplary embodiment of the disclosure.

Subsequently, details of the exposure control processing according to the present exemplary embodiment will be described with reference to FIG. 4. FIG. 4 is a flowchart exemplarily illustrating the exposure control processing according to the first exemplary embodiment of the disclosure. For example, the exposure control processing illustrated in FIG. 4 is started by an instruction for preparation for capturing an image being given in response to an operation member such as a release unit, which is not illustrated, being operated by a user. Timing to start the exposure control processing is not limited thereto, and the imaging device 100 may be configured to execute the exposure control processing at predetermined intervals during so-called live view display, or may be configured to execute the exposure control processing in response to an instruction other than the instruction for preparation for capturing an image.

In step S401, the camera control unit 109 first acquires image data for photometry. The image data for photometry is to include information for acquiring the pieces of image data at the respective polarization angles as described above, and a data format may be any format.

Subsequently, in step S402, the camera control unit 109 sets a photometric frame. The imaging device 100 may be configured to set the photometric frame by automatically detecting a freely-selected subject and setting a frame according to the subject, or by setting a freely-selected frame to a predetermined area in an imaging range. Alternatively, the imaging device 100 may be configured such that a user freely sets a frame having a predetermined size to a predetermined position in the imaging range.

Subsequently, in step S403, based on pieces of image data at respective polarization angles based on the image data for photometry acquired before, the camera control unit 109 calculates, out of the respective pieces of image data at the polarization angles of 0°, 45°, 90°, and 135°, a difference value between a maximum pixel signal value and a minimum pixel signal value in corresponding pieces of image data. The method of calculating the difference value is as described above.

Subsequently, in step S404, the camera control unit 109 compares the difference value calculated in step S403 and a predetermined threshold stored in a storage area (not illustrated) of the imaging device 100, and determines whether the difference value is the predetermined threshold or greater.

If it is determined that the difference value is the threshold or greater (YES in step S404), the camera control unit 109 determines that there is an area having a high reflectance in image data (imaging range) and the processing proceeds to step S405. In step S405, the camera control unit 109 sets the piece of image data at a polarization angle to be used for calculating a photometric value. If it is determined that the difference value is less than the threshold (NO in step S404), the camera control unit 109 determines that there is no area having a high reflectance in the image data, and the processing proceeds to step S406. In step S406, the camera control unit 109 sets image data of all pixels as the image data to be used for calculating the photometric value. The image data of all the pixels is to be data including pixel signal levels at all of the polarization angles based on the pieces of image data at the respective polarization angles as described above, and may not be image data output from all the pixels of the sensor 102.

Subsequently, in step S407, the camera control unit 109 calculates a photometric value based on the image data to be used for calculating the photometric value set before. Subsequently, in step S408, the camera control unit 109 determines exposure (a combination of the exposure values) such that brightness of the subject becomes appropriate based on the photometric value calculated in the processing in step S407. Subsequently, in step S409, the camera control unit 109 controls each unit of the imaging device 100 to have the exposure values determined in step S408, and ends the exposure control processing. The method of determining the exposure values may be any known method. For example, in the present exemplary embodiment, the combination of the exposure values appropriate for brightness of the subject is determined based on a program diagram recorded in advance in the storage area (not illustrated) of the imaging device 100. This is the exposure control processing according to the present exemplary embodiment. The imaging device 100 may be configured to consecutively execute the exposure control processing, for example, in a case of continuously receiving an instruction for preparation for capturing an image. The imaging device 100 may be configured to execute the adjustment of the exposure values in step S409 in response to an instruction for capturing an image being given by the user.

As described above, the imaging device 100 according to the present exemplary embodiment can output the plurality of pieces of image data at the respective different polarization angles (pieces of information regarding the respective polarization angles) from the sensor 102, and perform appropriate exposure control after detecting the reflectance of the subject serving as an imaging target. This configuration eliminates the need for a cumbersome operation, such as mounting a polarizing filter of a predetermined polarization angle in the imaging device 100 based on the user's own judgment, and automatic exposure control by the imaging device can prevent acquisition of an image having unnatural brightness.

While the description has been given of the configuration in which the sensor 102 itself includes the polarizing filter in the present exemplary embodiment, the imaging device 100 may be configured to include a polarizing filter different from that of the sensor 102. In this case, a polarizing filter may be used in which a polarization angle is selected with respect to a freely-selected pixel group (including a case of one pixel) of the sensor 102. A method of arranging the polarizing filters and the color filters and presence/absence of the color filters are not limited to the configuration described above. The imaging device 100 is to be configured to be capable of detecting a reflectance of the subject based on pieces of image data acquired at at least three or more different polarization angles.

The imaging device 100 in the present exemplary embodiment is configured to perform photometry based on a piece of image data at a polarization angle with which the influence of reflection is suppressed most out of the plurality of pieces of image data having respective different polarization angles in a case where the reflectance is high, and calculate the photometric value. However, the configuration is not limited thereto. For example, in the configuration of performing photometry using all the pieces of image data at the plurality of polarization angles, the imaging device 100 is to be configured to set a higher degree of weighting for photometry assigned to the piece of image data at the polarization angle with which the influence of reflection on the subject is suppressed most than a degree of weighting assigned to pieces of image data at the other polarization angles. Specifically, in the present exemplary embodiment described above, the description has been given of the case where the degree of weighting for photometry assigned to the piece of image data at the polarization angle with which the influence of the reflection on the subject is suppressed most is assumed to be one, while the degree of weighting assigned to the pieces of image data at the other polarization angles is assumed to be zero. In contrast, the imaging device 100 may be configured such that the degree of weighting for photometry assigned to the piece of image data at the polarization angle with which the influence of the reflection on the subject is suppressed most is set to 0.7, while the degree of weighting assigned to the pieces of image data at the other polarization angles is set to 0.1.

Second Exemplary Embodiment

In the first exemplary embodiment described above, the description has been given of the configuration in which the pieces of image data at the respective polarization angles are used as they are for calculating the photometric value. In contrast, in a second exemplary embodiment, a description will be given of a case of removing a reflection component of the subject more effectively by calculating an angle-dependent component of a polarization angle for each pixel based on information regarding a plurality of polarization angles. The same configuration and member of an imaging device 100 according to the present exemplary embodiment as the imaging device 100 according to the first exemplary embodiment are denoted by the same sign or part number, and a description thereof will be omitted.

Figure 5:
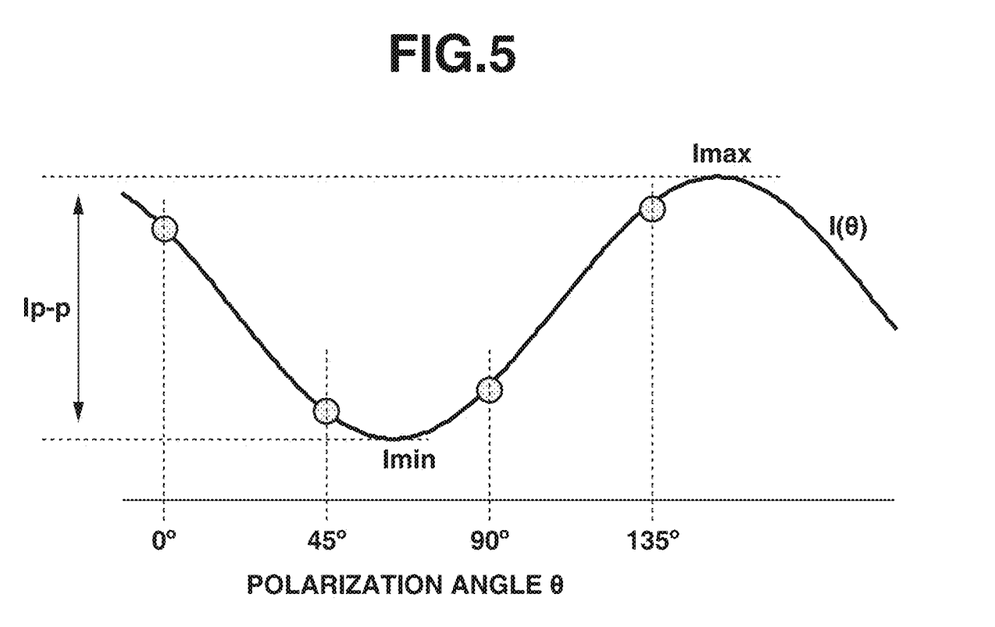
FIG. 5 is a diagram exemplarily illustrating a method of calculating an angle-dependent component Ip-p of polarization angles according to a second exemplary embodiment of the disclosure.

FIG. 5 is a diagram exemplarily illustrating a method of calculating an angle-dependent component Ip-p of polarization angles according to the second exemplary embodiment of the disclosure. In FIG. 5, assuming a case of outputting the pieces of image data at the respective four polarization angles (0°, 45°, 90°, and 135°) as illustrated in FIG. 2A described above, an axis of ordinate represents a luminance value (a photometric value) of a freely-selected pixel, and an axis of abscissa represents each polarization angle. FIG. 5 is a distribution chart acquired by plotting a photometric value (a luminance value) of a corresponding one pixel for each polarization angle with respect to the pieces of image data at the respective four polarization angles. A function $I(\theta)$ illustrated in FIG. 5 is acquired by seeking a freely-selected curve (a fitting curve) by fitting four luminance values based on the pieces of image data at the respective polarization angles to a sine function or cosine function of a period of 180°. As a unit of a luminance value, assume that one step of the luminance value corresponds to a brightness value (BV) of one in a so-called Additive System of Photographic Exposure (APEX). However, a configuration using another unit to represent the luminance value may be employed.

As illustrated in FIG. 5, in the present exemplary embodiment, a maximum luminance value of Imax and a minimum luminance value of Imin are calculated from the fitting curve acquired based on the pieces of image data at the plurality of polarization angles, and a difference between the maximum luminance value of Imax and the minimum luminance value of Imin is assumed to be the angle-dependent component Ip-p of the polarization angles of the subject. That is, a relation of the angle-dependent component Ip-p=Imax—Imin holds. The angle-dependent component Ip-p is information for determining a reflectance of the subject.

With this configuration, it is possible to accurately seek the angle-dependent component of the polarization angles of the subject in consideration of a case where a polarization angle different from the plurality of polarization angles of the pieces of image data causes a higher or lower luminance value (pixel signal level). Specifically, in the fitting curve illustrated in FIG. 5, the minimum value of the luminance values calculated from the image data is positioned between the polarization angles of 45° and 90°, and the maximum value of the luminance values is positioned at the polarization angle of 135° or greater. Even in this case, according to the present exemplary embodiment, it is possible to calculate the minimum value and maximum value of the luminance values from the fitting curve sought by approximation from a plurality of pieces of sampling data, and thus calculate an accurate photometric value according to brightness of the subject in compassion with the case of the first exemplary embodiment described above.

If luminance values of pieces of image data regarding three or more polarization angles are found, it is possible to calculate the angle-dependent component Ip-p of the polarization angles of the subject by employing an optimization technology such as a least-square method. In one embodiment, polarization angles for sampling are to be separated from each other at a certain distance to seek a more accurate fitting curve. In the present exemplary embodiment, pieces of image data for sampling are acquired at polarization angles at intervals of 45°.

As described above, the imaging device 100 according to the present exemplary embodiment can seek the angle-dependent component of the polarization angles based on the plurality of pieces of image data at the respective different polarization angles, and calculate the photometric value based on the angle-dependent component, and thus can perform more appropriate exposure control. This configuration, for example, eliminates the need for a cumbersome user operation, and enables the imaging device to automatically perform exposure control with high accuracy, thereby enabling reduction of acquisition of an image having unnatural brightness.

Third Exemplary Embodiment

Figure 6:
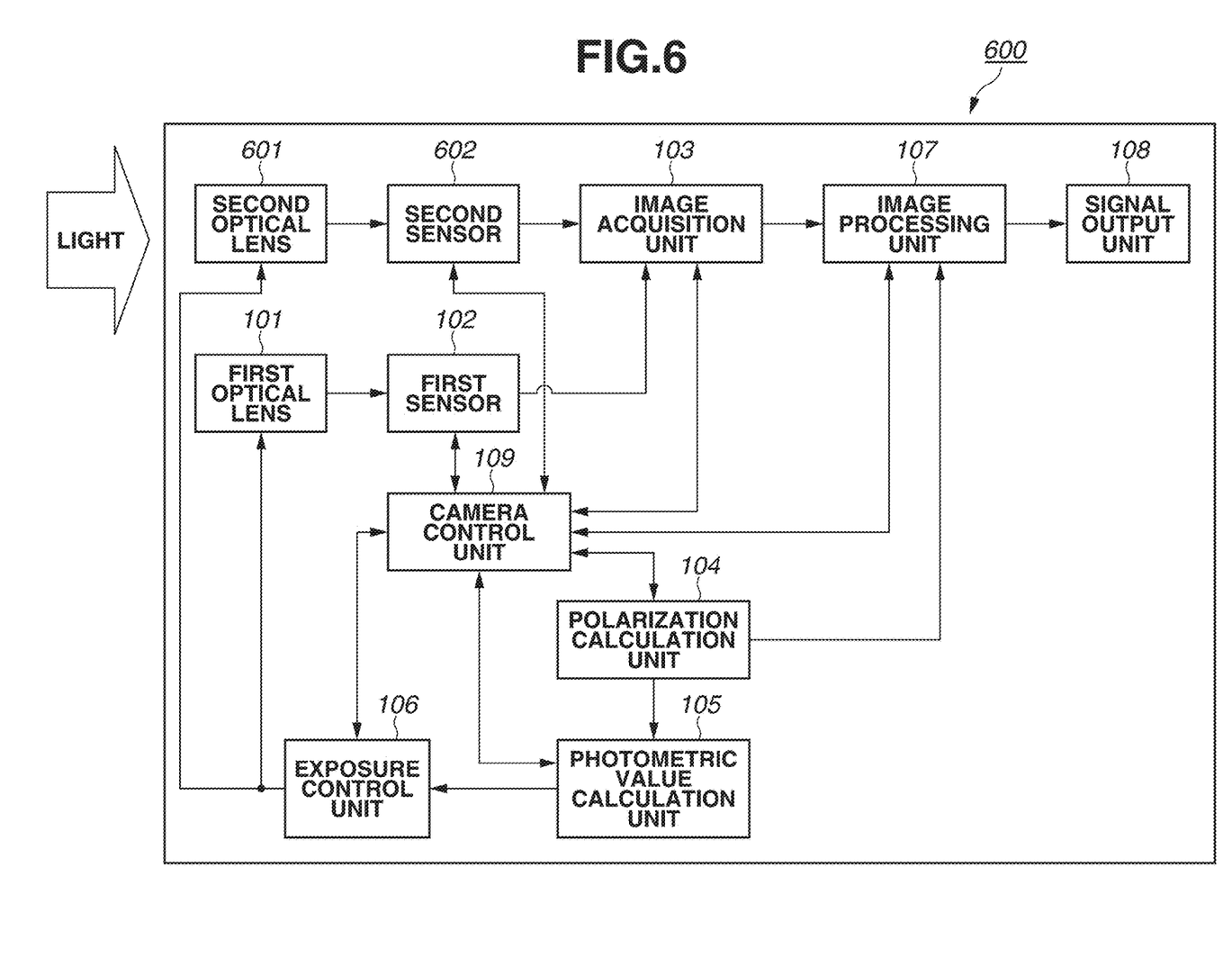
FIG. 6 is a block diagram illustrating a configuration of an imaging device 600 according to a third exemplary embodiment of the disclosure.

In the first exemplary embodiment described above, the description has been given of the configuration of acquiring the plurality of image data at the respective polarization angles using the sensor 102 provided with the polarizing filter and the image data for recording (still images or moving images). In contrast, in a third exemplary embodiment, a description will be given in detail of a case where an image sensor that acquires a plurality of pieces of image data at respective polarization angles and an image sensor that acquires image data for recording are separately provided. FIG. 6 is a block diagram illustrating a configuration of an imaging device 600 according to the third exemplary embodiment of the disclosure. One or more functional blocks illustrated in FIG. 6 may be implemented by hardware such as an ASIC and a PLA. Alternatively, one or more functional blocks may be implemented by a programmable processor (a microprocessor or a microcomputer) such as a CPU and an MPU executing software. Still alternatively, one or more functional blocks may be implemented by software and hardware in combination. Therefore, in the following description, even in a case where different functional blocks are described as operational subjects, these functional blocks can be implemented by identical hardware as operational subjects. The same configuration and member of the imaging device 600 according to the present exemplary embodiment as the imaging device 100 according to the first exemplary embodiment are denoted by the same sign or part number, and a description thereof will be omitted.

A second optical lens 601 is an imaging optical system to lead a light flux, which represents an optical image of a subject, to the inside of the imaging device 600 similarly to the (first) optical lens 101 according to the first exemplary embodiment described above, and can form an optical image on an imaging plane of a second sensor 602, which will be described below. The first optical lens 101 and the second optical lens 601 do not necessarily have the same configuration, and may have configurations different in focal length and/or aperture mechanism.

The second sensor 602 is an imaging unit that adopts a solid-state image sensor of a charge storage type similarly to the (first) sensor 102 described above, but is different from the first sensor 102 in that the second sensor 602 does not include the polarizing filter. The second sensor 602 includes a color filter (not illustrated), but does not necessarily include the color filter depending on usage. This is the difference in configuration between the imaging device 600 according to the present exemplary embodiment and the imaging device 100 according to the first exemplary embodiment described above.

The imaging device 600 according to the present exemplary embodiment is configured to acquire image data by the first sensor 102 and the second sensor 602 outputting signals to the identical image acquisition unit 103, but may be configured, for example, such that the first sensor 102 and the second sensor 602 output signals to respective acquisition units.

In the present exemplary embodiment, the imaging device 600 includes the two different sensors. One of the two sensors is the image sensor provided with the polarizing filter (or the imaging device that stores charges associated with an optical image of the subject acquired via the polarizing filter), and the other of the two sensors is the image sensor that stores charges without intervention of the polarizing filter. The polarizing filter can extract light in a specific vibration direction from non-polarized light (natural light). That is, the polarizing filter is a filter that removes light in signal directions other than a freely-selected polarization angle. Image data acquired via the filter having such a polarizing effect may be deteriorated due to a difference in spectral characteristics and the like in comparison with image data acquired without intervention of the polarizing filter.

Thus, the imaging device 600 in the present exemplary embodiment acquires image data for photometry using the first sensor 102 provided with the polarizing filter, and acquires still image data for recording using the second sensor 602 not provided with the polarizing filter. That is, based on which of outputs from the image sensors the imaging device 600 acquires an image differs depending on a type of acquired image data. With this configuration, the imaging device 600 can acquire image data for recording while preventing degradation of quality of image data due to the use of the polarizing filter.

As a modification, the imaging device 600 may be configured to acquire image data for photometry and image data for recording using the first sensor 102, for example, in a case where the subject has a high luminance area, or in a case where a reflectance is high, and using the second sensor 602 in other cases. In this case, the imaging device 600 is to be configured to determine whether a luminance value of the subject or an evaluation value indicating a reflectance is greater than a predetermined threshold.

As described above, the imaging device 600 according to the present exemplary embodiment can perform appropriate exposure control and acquire high-quality image data for recording by using different pieces of image data, i.e., image data acquired via the polarizing filter and image data acquired without intervention of the polarizing filter, depending on the situation. This configuration, for example, eliminates the need for a cumbersome user operation, and allows the imaging device to acquire high-quality image data while performing automatic exposure control.

While the exemplary embodiments of the disclosure have been described, the disclosure is not limited to the exemplary embodiments, and various modifications and changes can be made without departing from the gist of the disclosure. While the description has been given of the imaging device that integrates the optical lens in the exemplary embodiments, a configuration of adopting an interchangeable lens imaging device to which a lens is detachably mounted may be employed, for example.

In the exemplary embodiments, the description has been given of the shutter speed, the f-stop number, and the ISO sensitivity as the exposure values adjustable in the exposure control, a configuration capable of adjusting an exposure value associated with another element may be employed. For example, if the imaging device 100 according to the first exemplary embodiment described above is configured to include a light attenuation unit such as a neutral density (ND) filter that attenuates an amount of light incident on the sensor 102, the imaging device 100 may be configured to be capable of adjusting an exposure value associated with a density of the ND filter.

Furthermore, while the description has been given of the example of using a photometry result in the exposure control in the exemplary embodiments described above, the configuration is not limited thereto. For example, the imaging device may be configured to acquire a photometric value as an evaluation value indicating brightness of the subject and use the photometric value for white balance adjustment or gain adjustment of image data. That is, if the exposure control is control to acquire an evaluation value associated with adjustment of brightness at the time of capturing an image of the subject and acquiring image data, and actually change brightness of the image data based on the evaluation value, the exposure control can be applied to the setting of a degree of weighting according to the exemplary embodiments described above.

Furthermore, while the description has been given of the example of adopting the polarizing filters having different polarization angles for respective pixels or respective pixel groups constituting the image sensor, the configuration is not limited thereto. For example, the sensor 102 according to the first exemplary embodiment may be configured to have the polarizing filter arranged such that a plurality of different polarization angles corresponds to one pixel. In this case, since light can be polarized at different polarization angles with respect to one pixel signal, it is possible to acquire image data that removes light other than light in a plurality of vibration directions in pixel units.

While the description has been given of the exemplary embodiments assuming the digital camera as the example of the electronic device to implement the disclosure, the configuration is not limited thereto. A configuration adopting an imaging device other than the digital camera, such as a portable device such as a digital video camera or a smartphone, a wearable terminal, an on-vehicle camera, or a security camera, may be employed. The electronic device to implement the disclosure may be an electronic device such as an external device capable of controlling the imaging device provided with the sensor 102 described above. For example, the external device such as a personal computer (PC) capable of being connected to the imaging device including the sensor provided with the polarizing filter is to be configured to perform the photometry and exposure control according to the exemplary embodiments described above.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-228208, filed Dec. 18, 2019, which is hereby incorporated by reference herein in its entirety.

What is claimed is:

1. An electronic device, comprising:
   at least one processor; and
   at least one memory coupled to the at least one processor storing instructions that, when executed by the at least processor, cause the at least processor to function as:
   an information acquisition unit configured to acquire polarization information of a subject based on a plurality of pieces of image data that are based on a first signal output from a first sensor, wherein the first sensor is capable of capturing an optical image of the subject acquired via a polarizing filter provided with areas having different polarization angles;
   a control unit configured to control brightness of an image at the time of acquiring image data by capturing the optical image of the subject; and
   an evaluation value acquisition unit configured to acquire an evaluation value to be used by the control unit to control the brightness, based on at least one of the plurality of pieces of image data,
   wherein the plurality of pieces of image data have different polarization angles, by respectively being acquired via areas of the polarizing filter having the plurality of different polarization angles, and
   wherein the evaluation value acquisition unit is configured to set a degree of weighting to be assigned to the plurality of pieces of image data at the time of acquiring the evaluation value, based on the polarization information.

2. The electronic device according to claim 1,
   wherein the control unit controls an exposure at the time of acquiring the image data by capturing the optical image of the subject, and
   wherein the evaluation value acquisition unit is configured to acquire a photometric value of the subject as the evaluation value.

3. The electronic device according to claim 2, wherein the evaluation value acquisition unit is configured to set, based on the polarization information, a higher degree of weighting to be assigned to a piece of image data, out of the plurality of pieces of image data, at a polarization angle a light reflectance of the subject to be lower than light reflectances of pieces of image data at other polarization angles, than a degree of weighting to be assigned to the pieces of image data at the other polarization angles.

4. The electronic device according to claim 3, wherein the evaluation value acquisition unit is configured to set, based on the polarization information, the degree of weighting to be assigned to the piece of image data, out of the plurality of pieces of image data, at the polarization angle the light reflectance of the subject to be lower than the light reflectances of the pieces of image data at other polarization angles to one, and set the degree of weighting to be assigned to the pieces of image data at the other polarization angles to zero.

5. The electronic device according to claim 3, wherein the information acquisition unit is configured to acquire, as the polarization information, a difference value between minimum and maximum values of signal levels of the respective pieces of image data based on the plurality of pieces of image data, and obtain the light reflectance of the subject by comparing the difference values and a predetermined threshold in an imaging range.

6. The electronic device according to claim 1, wherein the plurality of pieces of image data comprises at least three pieces of image data having different polarization angles.

7. The electronic device according to claim 6, wherein the information acquisition unit is configured to acquire, as the polarization information, an angle-dependent component of a polarization angle of the subject by sampling the plurality of pieces of image data.

8. The electronic device according to claim 7, wherein the angle-dependent component of the polarization angle is information calculated based on a curve representing luminance distribution of the subject according to the polarization angle acquired by sampling the plurality of pieces of image data.

9. The electronic device according to claim 1, further comprising the first sensor, wherein the evaluation value acquisition unit is configured to acquire the evaluation value based on at least one of the plurality of pieces of image data acquired by using the first sensor in response to an instruction for preparation for image capturing being given.

10. The electronic device according to claim 1, further comprising:
    the image sensor; and
    a second sensor configured to capture an optical image of the subject acquired without intervention of the polarizing filter,
    wherein the evaluation value acquisition unit is configured to acquire the evaluation value based on either image data based on the first signal output from the first sensor or image data based on a second signal output from the second sensor according to a predetermined condition.

11. The electronic device according to claim 10, wherein the predetermined condition is the acquired polarization information.

12. The electronic device according to claim 10,
    wherein the predetermined condition is a type of image data to be acquired, and
    wherein the evaluation value acquisition unit is configured to acquire the evaluation value based on the image data output from the first sensor.

13. The electronic device according to claim 1, wherein the first sensor is a sensor provided with the polarizing filter of which polarization angle is controlled per pixel unit constituting the first sensor.

14. A control method of an electronic device, comprising:
acquiring polarization information of a subject based on a plurality of pieces of image data that are based on a first signal output from a first sensor, wherein the first sensor is capable of capturing an optical image of the subject acquired via a polarizing filter provided with areas having different polarization angles; and
acquiring an evaluation value to be used to control brightness of an image at the time of capturing the image of the subject and acquiring image data based on at least one of the plurality of pieces of image data,
wherein the plurality of pieces of image data have different polarization angles, by respectively being acquired via areas of the polarizing filter having the plurality of different polarization angles, and
wherein the acquisition of the evaluation value includes setting a degree of weighting to be assigned to the plurality of pieces of image data at the time of acquiring the evaluation value based on the polarization information.

15. The method according to claim 14, further comprising:
controlling an exposure at the time of acquiring the image data by capturing the optical image of the subject, and
acquiring a photometric value of the subject as the evaluation value.

16. The method according to claim 14, wherein the plurality of pieces of image data comprises at least three pieces of image data having different polarization angles.

17. A non-transitory computer-readable storage medium storing a computer-executable program for executing a method of controlling an electronic device, the method comprising:
acquiring polarization information of a subject based on a plurality of pieces of image data that are based on a first signal output from a first sensor, wherein the first sensor is capable of capturing an optical image of the subject acquired via a polarizing filter provided with areas having different polarization angles; and
acquiring an evaluation value to be used to control brightness of an image at the time of capturing the image of the subject and acquiring image data based on at least one of the plurality of pieces of image data,
wherein the plurality of pieces of image data have different polarization angles, by respectively being acquired via areas of the polarizing filter having the plurality of different polarization angles, and
wherein the acquisition of the evaluation value includes setting a degree of weighting to be assigned to the plurality of pieces of image data at the time of acquiring the evaluation value based on the polarization information.

18. The non-transitory computer-readable storage medium according to claim 17, further comprising:
controlling an exposure at the time of acquiring the image data by capturing the optical image of the subject, and
acquiring a photometric value of the subject as the evaluation value.

19. The non-transitory computer-readable storage medium according to claim 17, wherein the plurality of pieces of image data comprises at least three pieces of image data having different polarization angles.

* * * * *